US009550445B2

(12) United States Patent
Holmgren

(10) Patent No.: US 9,550,445 B2
(45) Date of Patent: Jan. 24, 2017

(54) LOADING MODULE CONFIGURED TO ACCOMMODATE TWO VEHICLES

(71) Applicant: Nils Holmgren, Rimbo (SE)

(72) Inventor: Nils Holmgren, Rimbo (SE)

(73) Assignee: NJEH i Roslagen AB, Rimbo (SE)

(*) Notice: Subject to any disclaimer, the term of this patent is extended or adjusted under 35 U.S.C. 154(b) by 0 days.

(21) Appl. No.: 14/403,077

(22) PCT Filed: May 2, 2013

(86) PCT No.: PCT/SE2013/050485
§ 371 (c)(1),
(2) Date: Nov. 21, 2014

(87) PCT Pub. No.: WO2013/176599
PCT Pub. Date: Nov. 28, 2013

(65) Prior Publication Data

US 2015/0224907 A1 Aug. 13, 2015

(30) Foreign Application Priority Data

May 22, 2012 (SE) ...................................... 1250514

(51) Int. Cl.
*B60P 3/08* (2006.01)
*B60P 3/06* (2006.01)
(Continued)

(52) U.S. Cl.
CPC .. *B60P 3/08* (2013.01); *B60P 1/04* (2013.01); *B60P 1/435* (2013.01); *B60P 3/062* (2013.01)

(58) Field of Classification Search
CPC .............. B60P 3/08; B60P 3/062; B60P 1/435
See application file for complete search history.

(56) References Cited

U.S. PATENT DOCUMENTS 4,420,165 A * 12/1983 Goodin ................. B60P 3/1033 280/414.1
4,749,317 A * 6/1988 Daniel ...................... B60P 3/08 410/24
(Continued)

FOREIGN PATENT DOCUMENTS

AU 640908 6/1990
AU 761483 B2 3/2000
(Continued)

OTHER PUBLICATIONS

International Preliminary Report on Patentability from corresponding PCT Application No. PCT/SE2013/050485, dated Dec. 4, 2014.
(Continued)

*Primary Examiner* — Kaitlin Joerger
(74) *Attorney, Agent, or Firm* — MKG LLC

(57) ABSTRACT

A loading module is configured to accommodate at least two vehicles. The loading module comprises a lower loading plate, an upper loading plate and a front device which connects the two loading plates. Two hydraulic cylinders are provided at a respective side of the loading plates and are arranged to enable displacement of the upper loading plate between a lower position and an upper position. The two hydraulic cylinders extend in a direction which together with the lower loading plate forms an acute angle having the tip directed towards the forward end when the upper loading plate is located in the lower and the upper position.

15 Claims, 3 Drawing Sheets

(51) Int. Cl.

| | |
|---|---|
| ***B60P 1/04*** | (2006.01) |
| ***B60P 1/43*** | (2006.01) |

(56) References Cited

U.S. PATENT DOCUMENTS

| | | | | |
|---|---|---|---|---|
| 4,880,250 | A | 11/1989 | Cravens et al. | |
| 4,898,418 | A * | 2/1990 | Lind, Sr. | B60P 3/20 296/182.1 |
| 4,911,590 | A * | 3/1990 | Green | B60P 3/08 410/26 |
| 4,954,038 | A | 9/1990 | Sheahan | |
| 5,080,541 | A * | 1/1992 | Andre | B60P 3/08 410/24.1 |
| 5,468,115 | A * | 11/1995 | Alvis | B60P 3/08 280/414.1 |
| 6,010,285 | A * | 1/2000 | Cox | B60P 3/08 410/24 |
| 6,485,237 | B1 * | 11/2002 | Sandwith | B60P 3/08 410/24 |
| 6,497,541 | B2 * | 12/2002 | Pawluk | B60P 3/08 410/26 |
| 7,341,420 | B1 | 3/2008 | Anderson | |
| 2008/0014068 | A1 * | 1/2008 | Smith | B60P 3/06 414/545 |
| 2009/0080992 | A1 | 3/2009 | Dusik | |

FOREIGN PATENT DOCUMENTS

| | | | |
|---|---|---|---|
| AU | 761483 | B2 | 6/2003 |
| DE | 10105701 | A1 | 7/2001 |
| DE | 102010048806 | A1 | 4/2012 |
| EP | 0196924 | A2 | 10/1986 |
| EP | 1231105 | A2 | 8/2002 |
| FR | 1337454 | A | 9/1963 |
| GB | 711289 | | 6/1954 |
| WO | 2011143734 | A1 | 11/2011 |
| WO | 2011173734 | A1 | 11/2011 |

OTHER PUBLICATIONS

International Search Report for corresponding EP Application No. 13793864.3.-1757/2852511 mailed on Apr. 29, 2016.

International Search Report for corresponding EP Application No. 13793864.3-1757/2852511 mailed on Apr. 29, 2016.

* cited by examiner

LOADING MODULE CONFIGURED TO ACCOMMODATE TWO VEHICLES

FIELD OF THE INVENTION

The present invention refers to a loading module configured to accommodate two vehicles, or at least two vehicles, preferably snowmobiles. In particular, the present invention refers to a loading module according to the preamble of claim 1.

BACKGROUND OF THE INVENTION

US 2008/0014068 discloses a device for accommodating two vehicles, for instance snowmobiles, positioned above each other. The device is intended to be positioned on a pickup or any other kind of vehicles. The device comprises two front uprights and two rear uprights extending upwardly from a lower loading plate. An upper loading plate is rotatably attached to the front uprights and slidable on the rear uprights between an upper position and a lower position. The upper loading plate can be raised upwardly and lowered by means of a winch.

U.S. Pat. No. 4,880,250 discloses a boat trailer having an upper loading plate and a lower loading plate. The upper loading plate is rotatably attached to a forward structure which extends upwardly from the lower loading plate. The upper loading plate may be lowered for receiving for instance a boat, see FIGS. 1 to 7. When the upper loading plate with the boat has been returned to an upper position a vehicle can be driven in onto the lower loading plate of the trailer.

U.S. Pat. No. 4,749,317 discloses a trailer having a fixed device comprising a lower loading plate for a vehicle and an upper loading plate for another vehicle. The upper loading plate is rotatably attached onto a frame around an axis located behind the front end of the upper loading plate. The trailer also comprises a ramp which can be used for loading the vehicles onto the lower loading plate and onto the upper loading plate. In addition, the ramp may be raised against the upper loading plate and may be locked to the upper loading plate when this is located in the upper position.

GB-711 289 discloses a larger trailer for receiving a plurality of cars, such as two cars on a lower loading plate and two on an upper loading plate. The trailer comprises at least hydraulic cylinder for displacement of the upper loading plate between a lower position and an upper position.

SUMMARY OF THE INVENTION

The object of the present invention is to provide a loading module which in an easy manner may accommodate two vehicles and which can be positioned on a trailer, a platform and on the ground, as a self-supporting unit. The loading module includes an uncomplicated structure and a low weight in order to enable positioning on trailers or other vehicles which do not require specific driving permissions.

This object is achieved by the loading module initially defined which is characterized in that the two hydraulic cylinders extend in a direction which together with the lower loading plate forms an acute angle having the tip directed towards the forward end when the upper loading plate is located in the lower position and in the upper position.

By providing the hydraulic cylinders in such a way a sufficient lifting force may be achieved for lifting the upper loading plate from the lower position to the upper position when the first vehicle is located on the upper loading plate, and also for lowering the upper loading plate with the second vehicle from the upper position to the lower position. In addition to the front device, the two hydraulic cylinders arranged in this manner are sufficient for providing said displacement of the upper loading plate. No additional rods or support devices are necessary for lifting the loading plate with the second vehicle to the upper position. In such a way the loading module achieves an uncomplicated design. Due to the fact that relatively few parts are needed for providing the lifting force, the total weight of the loading module is low.

According to an embodiment of the invention, the acute angle is greater when the upper loading plate is located in the upper position than when the upper loading plate is located in the lower position. Advantageously, the acute angle may lie in the interval 30-60°, for instance 40-60°, when the upper loading plate is located in the upper position. Such an acute angle ensures a sufficient lifting force.

According to a further embodiment of the invention, each hydraulic cylinder is rotatably attached to the lower loading plate at a first attachment point and rotatably attached to the upper loading plate at a second attachment point. The shortest distance from the first attachment point to a plane, which extends perpendicularly to the lower loading plate at the forward end of the lower loading plate, is shorter than the shortest distance from the second attachment point to said plane.

According to a further embodiment of the invention, the upper loading plate is rotatably attached to the front device, wherein said displacement is a rotary movement.

According to a further embodiment of the invention, the upper loading plate extends in the upper position substantially in parallel with the lower loading plate. In such a way, an advantageous horizontal, or substantially horizontal, position for the vehicle that is positioned on the upper loading plate is obtained. Such a horizontal position is essential for the security during driving.

According to a further embodiment of the invention, the loading module comprises a ramp which has a rear end and a forward end that is rotatably connected to the lower loading plate at the rear end of the lower loading plate. Such a ramp may be used for driving the first vehicle onto the lower loading plate. Advantageously, the upper loading plate has such a length that the rear end of the upper loading plate is located at the rear end of the lower loading plate when the upper loading plate is located in the lower position. In such a way, the ramp may be used also for driving the second vehicle onto the upper loading plate.

According to a further embodiment of the invention, the ramp is rotatable between a lowered position and a raised position. The ramp may then be configured in such a way that the rear end rests against the ground in the lowered position. Advantageously, the loading module is configured in such a way that the ramp in the lowered position forms an angle between a ground plane, which angle is less than 15°, preferably less than or equal to 10°. Such a relatively small angle ensures that for instance a snowmobile may be driven onto the ramp and especially onto the upper loading plate on its own without using any towing device.

According to a further embodiment of the invention, the upper loading plate rests against at least one support surface of the ramp, for instance in the form of a projection of the ramp, when the upper loading plate is located in the upper position and the ramp is located in the raised position. In such a way, the ramp offers a support for the upper loading plate when this is located in the upper position. Consequently, no force supply to the hydraulic cylinders is needed when the ramp is raised.

According to a further embodiment of the invention, the loading module comprises a lock member, which is arranged to enable locking of the ramp at the upper loading plate when this is located in the upper position and the ramp is located in the raised position. By means of such a locking member, unallowable access to the two vehicles accommodated in the loading module is prevented, for instance during storing when the loading module is positioned on the ground.

According to a further embodiment of the invention, the ramp comprises two parallel longitudinal plate elements which extend from the forward end to the rear end and which are connected to each other by means of a plurality of transversal rods. Such longitudinal plate elements are suitable for receiving wheels of a wheel vehicle and slide skies of a snowmobile. The transversal rods are especially suitable when the two vehicles are snowmobiles since the drive belt of the snowmobile may then obtain a secure grip on the transversal rods. A snowmobile may thus easily be driven along the ramp by its own.

According to a further embodiment of the invention, each of the lower loading plate and the upper loading plate comprises two parallel longitudinal plate elements, which extend from the forward end to the rear end and which are connected to each other by means of a plurality of transversal rods. The upper loading plate and the lower loading plate may thus have the same design and consequently the same technical advantages as the ramp.

According to a further embodiment of the invention, the transversal rods are provided at a distance from each other, which is at least 20 cm and at the most 60 cm, for instance at least 30 cm and at the most 50 cm. Such a distance ensures that a drive belt of a snowmobile obtains a secure grip on the transversal rods.

According to a further embodiment of the invention, each longitudinal plate element comprises a longitudinal outer beam, a longitudinal inner beam and a longitudinal plate between the outer beam and the inner beam, wherein the plate is lowered in relation to an upper end of the outer beam and the inner beam. The transversal rods are attached to the inner beam of the two longitudinal plate elements.

According to a further embodiment of the invention, a front device is fixedly attached to the lower loading module and extends upwardly from the forward end of the lower loading plate. Advantageously, the front device may comprise a frame extending substantially perpendicularly from the lower loading plate. Furthermore, the front device may comprise at least one support member extending obliquely from the lower loading plate and connecting the frame and the lower loading plate.

According to a further embodiment of the invention, the loading module is configured to be positioned on a trailer towed by a motor vehicle.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
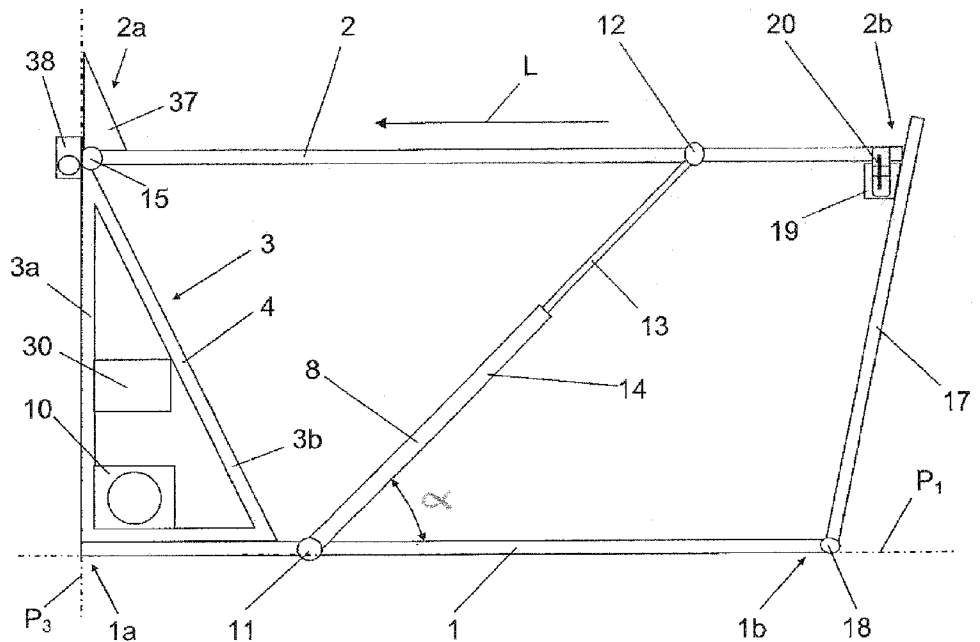
FIG. 1 discloses a side view of a loading module according to the invention.
Figure 2:
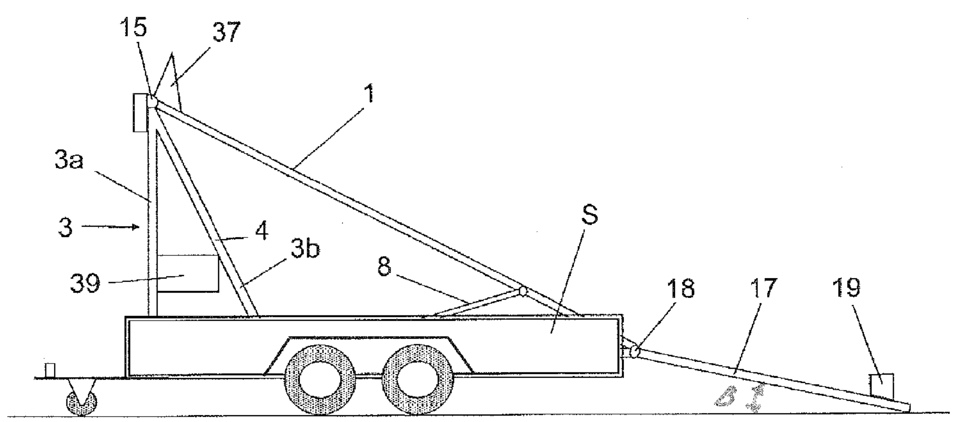
FIG. 2 discloses a side view of the loading module positioned on a trailer.
Figure 6:
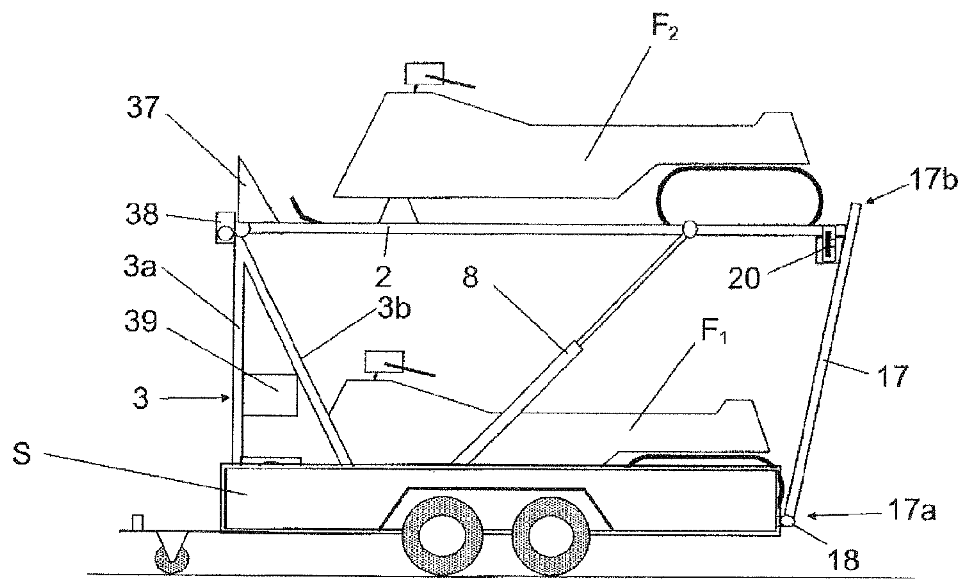
FIG. 6 discloses a side view of the loading module positioned on a trailer and having two snowmobiles.

FIGS. 1, 2 and 6 disclose an embodiment of a loading module configured for accommodating two vehicles $F_1$ and $F_2$, which in the embodiment disclosed are two snowmobiles. The loading module comprises a lower loading plate 1 and an upper loading plate 2, which extend along a longitudinal direction L. The lower loading plate 1 has a forward end 1*a* and a rear end 1*b*, and is configured to receive a first vehicle $F_1$. The lower loading plate 1 may have a length of 200-250 cm, for instance 210 cm, along the longitudinal direction L. The upper loading plate 2 has a forward end 2*a* and a rear end 2*b*, and is configured to receive a second vehicle $F_2$. The upper loading plate 2 may have a length of 350-400 cm, for instance 360 cm along the longitudinal direction L.

A front device 3 extends upwardly from the lower loading plate 1 and connects the lower loading plate 1 with the upper loading plate 2. The front device 3 is fixedly attached to the lower loading plate 1 and extends upwardly from the forward end 1*a* of the lower loading plate 1, for instance 130-140 cm from the lower loading plate 1. The front device 3 is thus stationary in relation to the lower loading plate 1.

The front device 3 may comprise a frame 3*a*, which extends perpendicularly, or substantially perpendicularly, from the lower loading plate 1. Furthermore, the front device 3 may comprise at least one support member 3*b*, which extends obliquely, or obliquely forwardly, from the lower loading plate 1, and connects the frame 3*a* to the lower loading plate 1.

Advantageously, the frame 3*a* is a rectangular frame 3*a* which extends in parallel with a plane $P_3$ from the forward end 1*a* of the lower loading plate to the forward end 2*a* of the upper loading plate 2. Preferably, this plane $P_3$ is essentially vertical when the loading module is located in a normal position.

Lower and upper mean in this application that the lower loading plate 1 is located below the upper loading plate 2 in the normal position. The forward end 1*a*, 2*a* means the end that is forward in the longitudinal direction L which corresponds to the normal transport direction of the loading module. Furthermore, the vehicles $F_1$, $F_2$ to be accommodated on the loading module are driven onto the same from the rear end 1*b*, 2*b* towards the forward end 1*a*, 2*a*.

The front device 3 also comprises two support members 4 extending from an upper end of the front device 3 obliquely downwardly and rearwardly. In such a way, the front device 3 obtains a stable construction which permits secure support of the forward end 2*a* of the upper loading plate 2.

Figure 7:
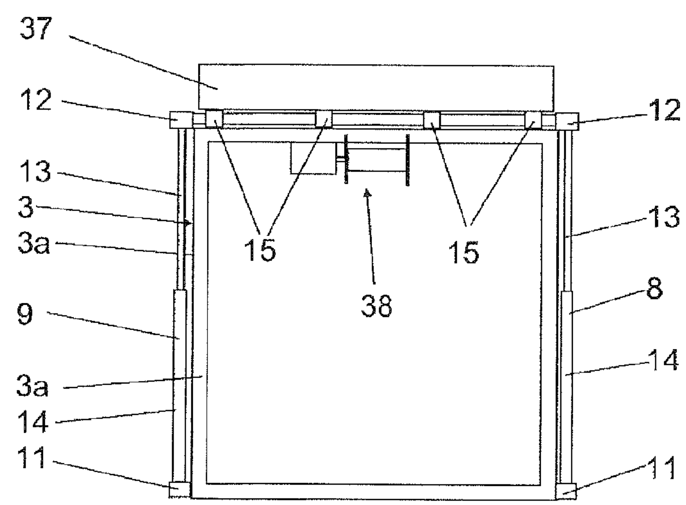
FIG. 7 discloses an end view of the loading module.

The loading module also comprises two hydraulic cylinders 8 and 9, which are provided on a respective side of the lower loading plate 1 and the upper loading plate 2, see FIG. 7. The two hydraulic cylinders 8, 9 are connected to a hydraulic pump 10 and enable displacement of the upper loading plate 2 between a lower position, see FIG. 2, which permits movement of the second vehicle $F_2$ to and from the upper loading plate 2, and an upper position which permits loading of the first vehicle $F_1$ to and from the lower loading plate 1. Each hydraulic cylinder 8, 9 is rotatably attached to the lower loading plate 1 at a first attachment point 11 and rotatably attached to the upper loading plate 2 at a second attachment point 12.

As can be seen in FIGS. 1 and 6, the upper loading plate 2 extends in the upper position in parallel, or substantially in parallel, with the lower loading plate 1.

The two hydraulic cylinders 8 and 9 extend in a direction which together with the lower loading plate 1, or an extension plane $P_1$ for the lower loading plate 1, forms an acute angle $\alpha$ having the tip directed towards the forward end 1*a* when the upper loading plate 2 is located in the lower position and in the upper position. The extension plane $P_1$ is perpendicular, or substantially perpendicular to the plane $P_3$. The acute angle $\alpha$ is greater when the upper loading plate 2 is located in the upper position than when the upper loading plate 2 is located in the lower position as can be seen in FIGS. 1 and 2. The acute angle $\alpha$ may lie in the interval 30-60°, for instance 45-50°, when the upper loading plate 2 is located in the upper position.

Each hydraulic cylinder comprises a piston 13 which is hydraulically displaceable in a cylinder 14. The hydraulic cylinders 8, 9 may with the illustrated design be relatively weak, i.e. the diameter of the cylinder 14 may be 4-6 cm, preferably about 5 cm. The diameter of the piston 13 may be 3-5 cm, preferably about 4 cm.

The upper loading plate 2 is rotatably attached to the front device 3 by means of at least one rotary joint, for instance two or four rotary joints 15 so that the displacement of the upper plate 2 from the upper position to the lower position and opposite is a rotary movement.

The loading module comprises a ramp 17 which has a rear end 17*b* and a forward end 17*a* which is rotatably attached to the lower loading plate 1 at the rear end 1*b* of the lower loading plate 1 by means of for instance four rotary joints 18. The ramp 17 is rotatable between a lowered position, see FIG. 2, when the rear end 17*b* of the ramp 17 rests against the ground, and a raised position, see FIGS. 1 and 6. In order to enable driving of the vehicles $F_1$ and $F_2$ onto the loading module, it is important that the ramp 17 has a small inclination. Advantageously, the loading module is configured in such a way that the ramp 17 in the lowered position forms an angle $\beta$ with a ground plane. This angle may be less than 15°, preferably less than 10°, for instance 8-10°. The ramp may have a length of 140-160 cm.

The ramp 17 also comprises one or several support surfaces, which for instance may be provided on each of two projections 19 provided at a respective side of the ramp 17 in the proximity of the rear end 17*b*. When the ramp 17 is located in the raised position and the upper loading plate 1 is located in the upper position, the upper loading plate 1 rests against the projections 19 as can be seen in FIGS. 1 and 6. The support surface or support surfaces may also be formed by other elements than the disclosed projections 19 of the ramp 17, for instance the end surface of the ramp 17.

Advantageously, the loading module also comprises at least a lock member 20 which enables locking of the ramp 17 at the upper loading plate 2 when this is located in the upper position and the ramp 17 is located in the raised position, i.e. when the upper loading plate 2 rests against the support surface or as in the embodiment disclosed against the projections 19. In such a way, the stability and the security is further improved. Furthermore, it is possible to lock the loading module in the position disclosed in FIG. 6 and in such a way prevent unallowable access to the vehicles $F_1$ and $F_2$.

Figure 3:
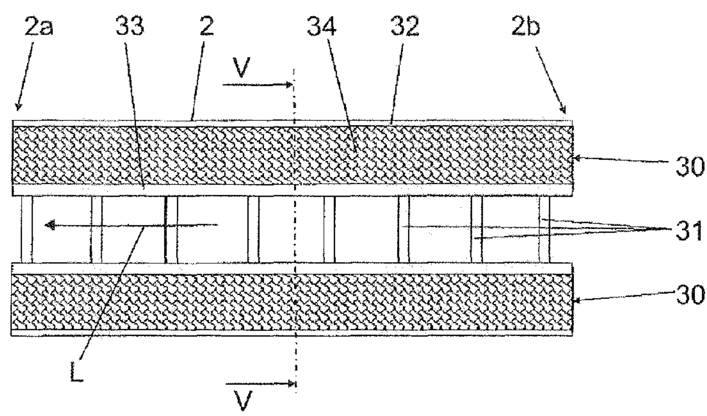
FIG. 3 discloses a plane view of an upper loading plate of the loading module.
Figure 4:
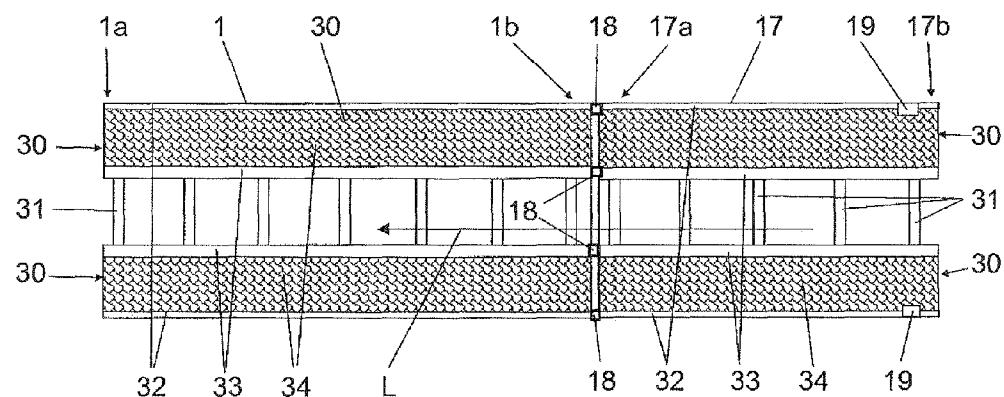
FIG. 4 discloses a plane view of a lower loading plate and a ramp of the loading module.
Figure 5:
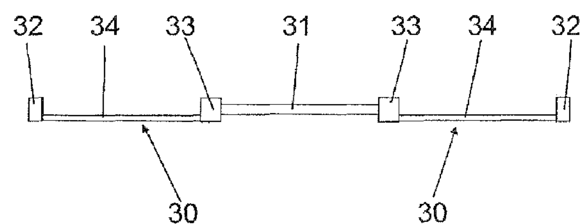
FIG. 5 discloses a cross-sectional view along the line V-V in FIG. 3.

Each of the ramp 17, the lower loading plate 1 and the upper loading plate 2 comprises two parallel plate elements 30 which extend from the forward end 17*a*, 1*a*, 2*a* to the rear end 17*b*, 1*b*, 2*b*, see FIGS. 3-5. The two plate elements 30 are connected to each other by means of a plurality of transversal rods 31. The rods 31 are advantageously provided at a distance from each other, which is at least 20 cm and at the most 60 cm. Such a distance permits that a drive belt of a snowmobile may grip the rods 31 and thus drive the snowmobile upwardly onto the ramp 17 and upwardly onto the upper loading plate 2. The length of the rods 31, i.e. the distance between the two plate elements 30, is chosen so that a drive belt of a snowmobile of a normal kind may be accommodated between the two plate elements 30.

Each longitudinal plate element 30 comprises a longitudinal outer beam 32, a longitudinal inner beam 33 and a longitudinal plate 34 between the outer beam 32 and the inner beam 33. The inner beam 33 may be a rectangular beam having a substantially square cross-section. The outer beam 32 may be somewhat weaker and for instance also a rectangular beam having a rectangular cross-section as appears from FIG. 5. The above mentioned rotary joints 15 and/or 18 are advantageously attached to the four beams 32, 33. As can be seen from FIG. 5, the plate 32 is lowered in relation to an upper end of the outer beam 32 and the inner beam 33. In such a way a path is created for the skies of a snowmobile so that the snowmobile is guided in a secure manner along the plate elements 30. The plate 34 is also advantageously lowered in relation to the upper end of the rods 31. That means that the skies of a snowmobile will be less exposed to load than if the upper end of the rods 31 and the plates 34 were in the same plane.

Advantageously, the loading module also comprises a front sheet 37 provided at the forward end 2*a* of the upper loading module 2. This front sheet 37 prevents the vehicle $F_2$ from being driven or pulled to far forwardly.

Furthermore, the loading module advantageously comprises a winch 38 provided at the front device and arranged to enable pulling of a vehicle onto the upper loading plate 2 and also onto the lower loading plate 1.

The loading module may also comprise a control panel 39 provided at the front device 3 and arranged to enable control and maneuvering of the hydraulic cylinders 8, 9 via the hydraulic pump 10 and of the winch 38.

The loading module may be positioned onto a trailer S as shown in FIG. 2. The loading module may also be positioned on a platform of a suitable truck, or on the ground and used for parking and/storing of the vehicles $F_1$ and $F_2$.

The invention is not limited to the embodiments disclosed but may be varied and modified within the scope of the following claims.

The invention claimed is:

1. A loading module configured to accommodate at least two vehicles, comprising a lower loading plate, which has a forward end and a rear end and is configured to receive a first vehicle, an upper loading plate, which has a forward end and a rear end and is configured to receive a second vehicle, a front device, which is fixedly attached to and extends upwardly from the lower loading plate and connects the lower loading plate with the upper loading plate, wherein the upper loading plate is rotatably attached to the front device, and two hydraulic cylinders, which are provided on a respective side of the lower loading plate and the upper loading plate and arranged to enable displacement of the upper loading plate between a lower position, which permits movement of the second vehicle to and from the upper loading plate, and an upper position, which permits movement of the first vehicle to and from the lower loading plate, wherein said displacement is a rotary movement, wherein the two hydraulic cylinders extend in a direction which together with the lower loading plate forms an acute angle having a tip directed towards the forward end when the upper loading plate is located in the lower position and in the upper position, wherein the loading module comprises a ramp, which has a rear end and a forward end that is rotatably connected to the lower loading plate at the rear end of the lower loading plate, wherein the ramp is rotatable between a lowered position, when the rear end rests against the ground, and a raised position, wherein the upper loading plate, when this is located in the upper position and the ramp is located in the raised position, rests against at least one projection of the ramp, which projection is provided at a distance from the rear end of the ramp, and wherein the loading module forms a self-supporting unit to permit positioning of the loading module on a trailer or on the ground.

2. The loading module according to claim 1, wherein the acute angle is greater when the upper loading plate is located in the upper position than when the upper loading plate is located in the lower position.

3. The loading module according to claim 1, wherein the acute angle lies in an interval 30°-60° when the upper loading plate is located in the upper position.

4. The loading module according to claim 1, wherein each hydraulic cylinder is rotatably attached to the lower loading plate at a first attachment point and is rotatably attached to the upper loading plate at a second attachment point.

5. The loading module according to claim 1, wherein the upper loading plate in the upper position extends substantially in parallel with the lower loading plate.

6. The loading module according to claim 1, wherein the loading module is configured in such a way that the ramp in the lowered position forms an angle between a ground plane, which angle is less than 15°.

7. The loading module according to claim 1, wherein the loading module comprises a lock member, which is arranged to enable locking of the ramp at the upper loading plate when this is located in the upper position and the ramp is located in the raised position.

8. The loading module according to claim 1, wherein the ramp comprises two parallel longitudinal plate elements which extend from the forward end to the rear end and which are connected to each other by means of a plurality of transversal rods.

9. The loading module according to claim 1, wherein each of the lower loading plate and the second upper loading plate comprises two parallel longitudinal plate elements which extend from the forward end to the rear end and which are connected to each other by means of a plurality of transversal rods.

10. The loading module according claim 8, wherein the rods are provided at a distance from each other, which is at least 20 cm and at the most 60 cm.

11. The loading module according to claim 9, wherein each longitudinal plate element comprises a longitudinal outer beam, a longitudinal inner beam and a longitudinal plate between the outer beam and the inner beam, wherein the plate is lowered in relation to an upper end of the outer beam and the inner beam.

12. The loading module according to claim 1, wherein the front device is fixedly attached to the lower loading plate and extends upwardly from the forward end of the lower loading plate.

13. The loading module according to claim 1, wherein the loading module is configured to be positioned on a trailer towed by a motor vehicle.

14. The loading module according claim 9, wherein the rods are provided at a distance from each other, which is at least 20 cm and at the most 60 cm.

15. The loading module according to claim 8, wherein each longitudinal plate element comprises a longitudinal outer beam, a longitudinal inner beam and a longitudinal plate between the outer beam and the inner beam, wherein the plate is lowered in relation to an upper end of the outer beam and the inner beam.

* * * * *